J. AGUILLON.
CALORIMETER OF THE CONTINUOUS AND RECORDING TYPE FOR DETERMINING THE CALORIFIC POWER OF FLUID COMBUSTIBLES.
APPLICATION FILED JUNE 24, 1920.
1,435,783.
Patented Nov. 14, 1922.
2 SHEETS—SHEET 1.
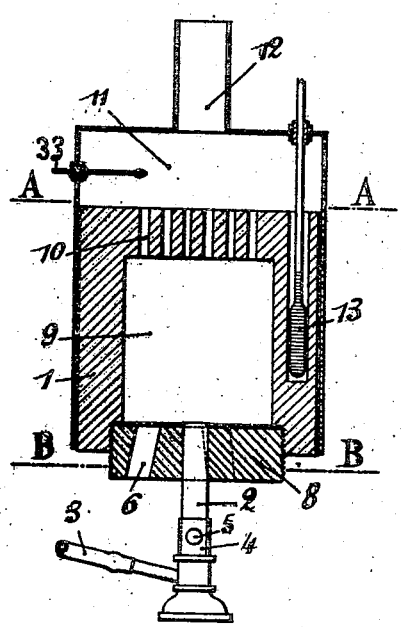
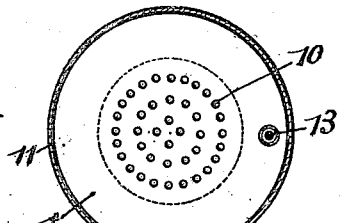
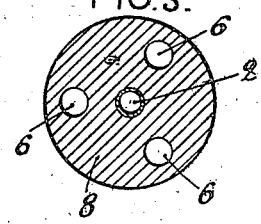
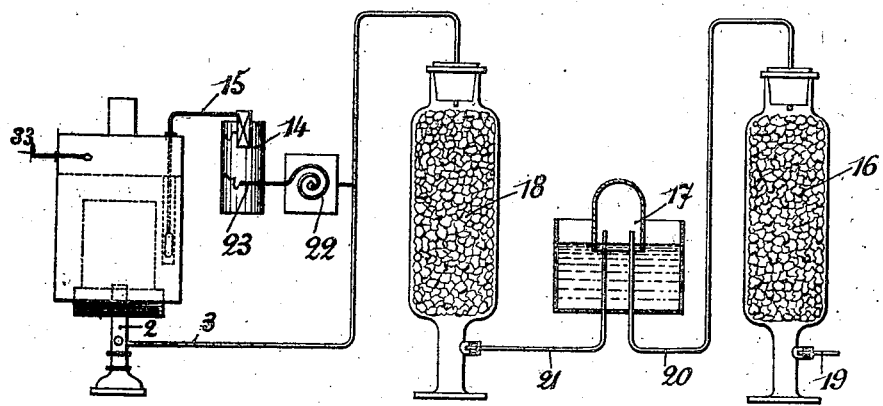
Inventor:-
Jacques Aguillon
by H. B. Willson & Co.
Attorneys J. AGUILLON.
CALORIMETER OF THE CONTINUOUS AND RECORDING TYPE FOR DETERMINING THE CALORIFIC POWER OF FLUID COMBUSTIBLES.
APPLICATION FILED JUNE 24, 1920.
1,435,783.
Patented Nov. 14, 1922.
2 SHEETS—SHEET 2.
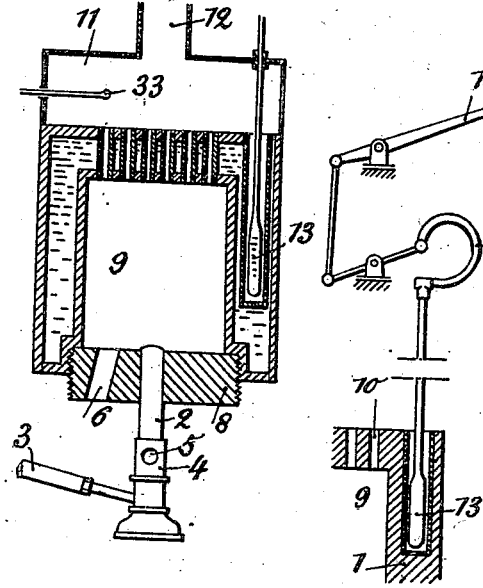
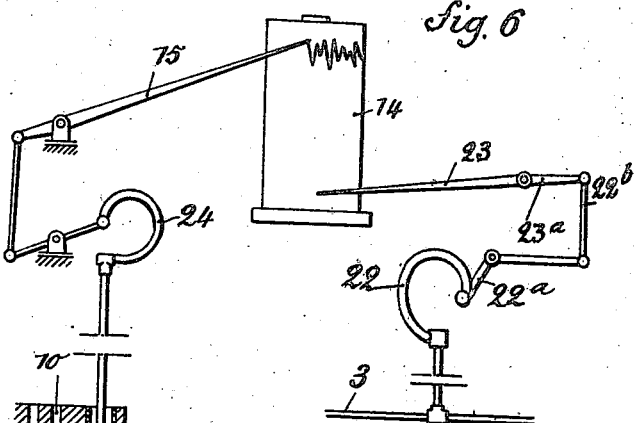
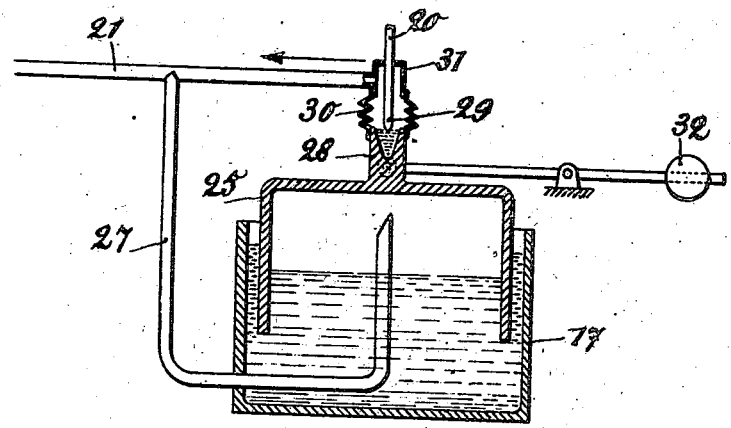
Inventor
Jacques Aguillon Patented Nov. 14, 1922.

1,435,783

UNITED STATES PATENT OFFICE.

JACQUES AGUILLON, OF PARIS, FRANCE.

CALORIMETER OF THE CONTINUOUS AND RECORDING TYPE FOR DETERMINING THE CALORIFIC POWER OF FLUID COMBUSTIBLES.

Application filed June 24, 1920. Serial No. 391,517.

(GRANTED UNDER THE PROVISIONS OF THE ACT OF MARCH 3, 1921, 41 STAT. L., 1313.)

*To all whom it may concern:*

Be it known that I, JACQUES AGUILLON, a citizen of the Republic of France, residing at Paris, Seine Department, 19 Rue de la Rochefoucauld, have invented certain new and useful Improvements in Calorimeters of the Continuous and Recording Type for Determining the Calorific Power of Fluid Combustibles (for which I have filed application in France May 10, 1919, Patent No. 506,993), of which the following is a specification.

The types of calorimeter which are employed at the present time for determining calorific values make use of the following principle as a general rule. The heat of combustion is transmitted to a mass of water weighing M grammes, whose temperature is raised by X degrees.

The heat absorbed is M X calories.

The present invention makes use of an entirely different principle. The fluid whose calorific value is to be determined is conducted at a constant rate into a suitable burner disposed within a body or substance of any kind having sufficient conducting properties whereby its temperature shall be the same in all parts at any given moment. This body, which constitutes the calorimeter, is disposed within an enclosed space and out of contact of air currents or all sudden or considerable variations of temperature. The entire device is properly disposed in order to effect the complete combustion of the fluid. It is evident that in this case the temperature of the calorimeter varies in the same sense as the calorific value of the fluid under examination. It will therefore suffice to record or to observe the temperature of the calorimeter by means of a suitable device and to compare the results with a previously prepared chart established either directly or by comparison, in order to be able to ascertain at any time the calorific value of the fluid under test.

The present device will be readily understood with reference to the following description of an embodiment of the invention which is given by way of example, as well as a description of the method of mounting the same.

Fig. 1 is a sectional view in elevation, of the calorimeter proper.

Figs. 2 and 3 are sections taken respectively along the lines A—A and B—B of Fig. 1.

Fig. 4 shows the arrangement of the calorimeter and the accessory devices employed for measurement of the calorific power of a gas.

Figure 5 is a vertical section of the double walled calorimeter filled with a liquid.

Figure 6 is a view showing in elevation the gas pressure recording device and temperature indicating device.

Figure 7 is a vertical sectional view through the gas pressure regulator.

The calorimeter 1 is composed of a hollow cylinder of copper of some thickness, or of any other good heat conducting metal, or again, by a double-walled jacket filled with a liquid (Fig. 5). At the lower part is disposed the burner 2, supplied with the gas under examination which enters through the piping 3.

A sleeve 4 is provided for regulating the inlet of the principal air supply entering the burner at 5. The secondary air supply enters through the orifices 6, which also serve to inspect the operation of the burner. The upper end of the burner is constructed together with a disk 8 constituting the bottom of the chamber 9 in which the combustion takes place. The products of combustion circulate from bottom to top within the chamber 9, then pass through a considerable number of small tubes 10 in the copper mass 1, whence they reach the upper chamber 11 and escape into the outer air through the chimney 12. The temperature of the calorimeter is measured by means of a thermometer 33 and also by means of a thermometer 13 disposed within a recess in the copper mass. Temperature variations are recorded for instance upon a cylinder 14 moving in front of a tracer point 15 (Figs. 4 and 6), in the same manner as for the customary measuring apparatus.

This measuring device may be of any suitable construction. In the case represented there is employed for instance a bent tube 24 whose shape becomes changed by the variations of pressure. These pressure variations are produced in the thermometer 13 which is disposed in the wall of the combustion chamber 9 and contains a very volatile liquid. Pressures are transmitted to the tube 24 undergoing change of shape, through the intermediary of a non-condensable fluid, in a known manner. The cylinder 14 is actuated in a known manner by suitable clockwork disposed in the interior thereof and consequently not visible.

The gas under examination only reaches the burner 2 through the piping 3 after having passed through a cleaning chamber 16 containing oxide of iron and saw dust, a pressure regulator 17 and a dryer 18 containing pumice impregnated with calcium chloride. These devices are connected by means of the piping 19, 20, 21.

The pressure regulator is provided with a receptacle 17 containing a liquid and an inverted bell-shaped member 25 which is vertically guided and carried by a lever 32 having a counter-balance weight mounted thereon. The interior of the bell-shaped member is connected with the gas supply passage 20, 21 by a pipe 27. According to the variations of pressure, the bell-shaped member is caused to rise or descend.

Referring to Fig. 7, it will be seen that the bell-shaped member is provided with a trough 28 containing mercury. The passage 20 opens through a nozzle 29 into a chamber formed by a corrugated membrane 30 connecting the trough 28 with a hood 31 surrounding the tube 20. From this hood starts the piping 21 which connects the apparatus with the dryer 18. When the pressure becomes too great, the bell-shaped member rises together with the trough 28, and the nozzle 29 dips into the mercury, thus cutting off the flow of gas to the burner. This flow is again permitted when the pressure falls sufficiently to cause the trough to descend and to free the nozzle 29. Upon the piping 3 is disposed a pressure gauge whereby the constant pressure of the gas can be observed through the medium of a pointer 23 moving over the common cylinder 14 which serves to record at the same time the variations in the calorific value of the gas. The pressure gauge is provided with a tube 22, the shape of which changes as the pressure varies and actuates the pointed member 23 by means of amplifying levers 22$^a$, 23$^a$ connected together by a rod 22$^b$.

In order to carry on the measurement of the calorific value of the gas in a correct manner, the pressure of the gas should remain constant, and this requirement justifies the use of the recording pressure gauge 22.

Claims:

1. In a calorimeter for determining the calorific value of fluid combustibles, the combination of a combustion chamber whose walls, are thick and are good conductors of heat, means for burning within the said chamber a fluid supplied in a constant manner, and means for measuring the temperature of the walls of the said chamber themselves.

2. In a calorimeter for determining the calorific value of fluid combustibles, the combination of a combustion chamber whose walls are thick and are good conductors of heat, means for effecting a constant supply of a fluid combustible into the said chamber, there being a recess in one of the walls of the combustion chamber and a thermometer disposed in the said recess.

3. In a calorimeter for determining the calorific power of fluid combustibles, the combination of a combustion chamber whose walls are thick and are good conductors of heat, means for effecting a constant supply of fluid combustible to the said chamber, and means for measuring and recording the temperature of the said walls of the chamber.

4. In a calorimeter for determining the calorific power of fluid combustibles, the combination of a combustion chamber whose walls are thick and are good conductors of heat, means for effecting a constant supply of a fluid combustible to the said chamber, means for measuring and recording the pressure of the said fluid, and means for measuring and recording the temperature of the said walls of the chamber.

5. In a calorimeter for determining the calorific power of fluid combustibles, the combination of a combustion chamber whose walls are thick and are good conductors of heat, means for effecting a constant supply of a fluid combustible to the said chamber, means for measuring and recording the pressure of the said fluid, means for effecting the combustion of the said fluid within the said chamber, and means for measuring and recording the temperature of the said walls of the chamber, the said means for respectively measuring and recording the pressure and temperature being adapted to produce both records thereof upon a common surface.

In testimony, that I claim the foregoing as my invention I have signed my name in presence of two subscribing witnesses.

JACQUES AGUILLON.

Witnesses:
CAMILLE BLÉTRY,
MAURICE ROUX.